Dec. 6, 1949  F. V. COLLINS  2,490,416
APPARATUS FOR FORMING CLOSED-END TUBES
Filed June 2, 1947
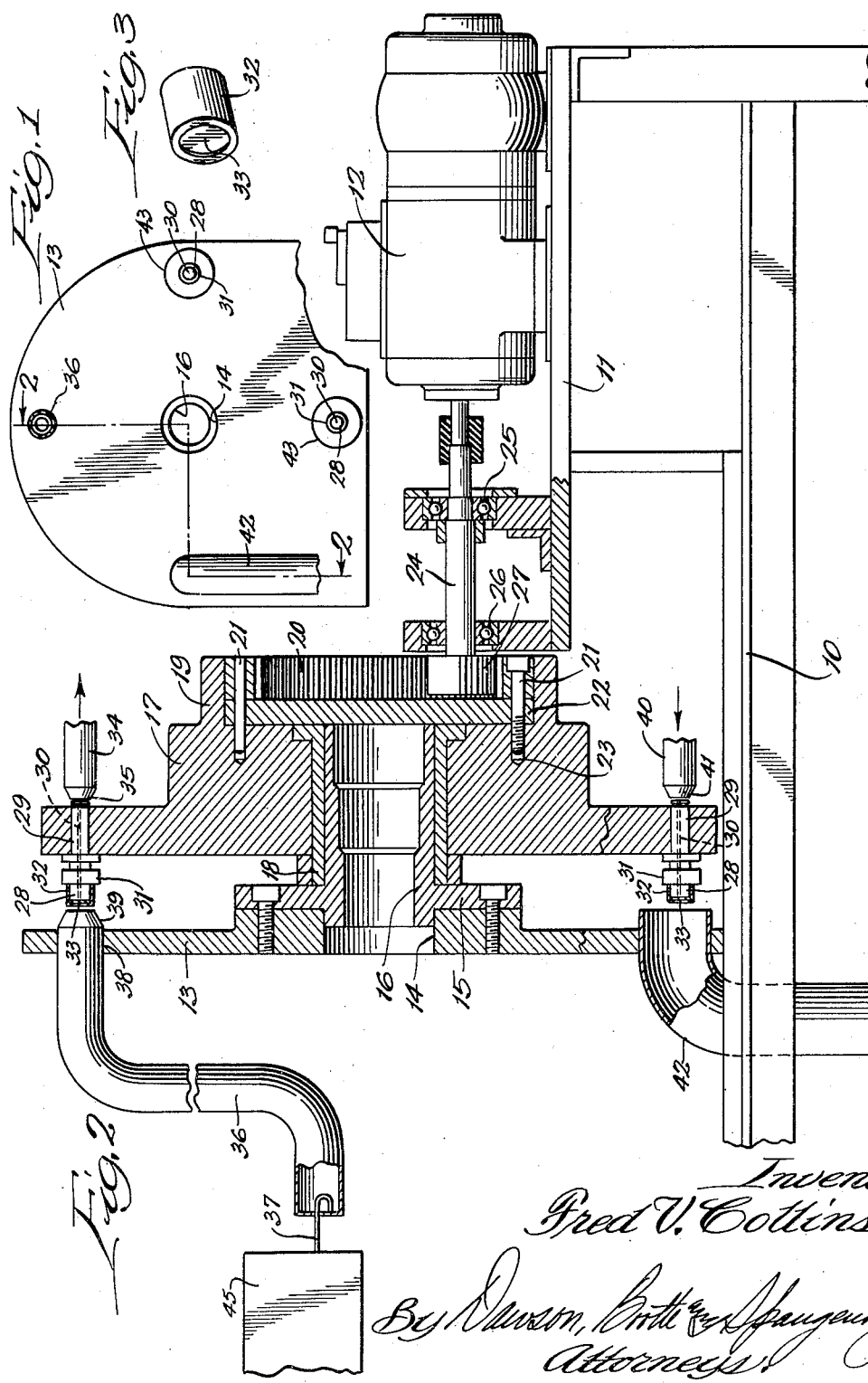

Patented Dec. 6, 1949

2,490,416

UNITED STATES PATENT OFFICE 2,490,416

APPARATUS FOR FORMING CLOSED-END TUBES

Fred V. Collins, Des Plaines, Ill., assignor to William F. Stahl, Kenilworth, Ill.

Application June 2, 1947, Serial No. 751,692

8 Claims. (Cl. 154—1)

This invention relates to the manufacture of a plastic container. It is useful in the sealing of at least one end of a plastic tube to provide a structure applicable to many uses.

Tubes are formed under present practice from plastic materials, such as cellulose acetate, vinyl acetate, vinyl chloride (copolymer), and from a variety of other materials of a fusible character by inexpensive methods and in substantial volume. If such available tubular products could be utilized in the forming of containers, bobbins, caps, and other products, a substantial reduction in the cost of such vinyl products would result, while at the same time furnishing unusually sturdy and desirable products.

The object of the present invention is to provide means and a method for producing the products described above from such fusible tubes in conjunction with plastic disks, etc., which are fused against the one end or both ends of such tubes. Yet another object is to provide apparatus which will subject the tubes and disks to a sequence of operations whereby an effective sealing between the edges of the disk and the end of the tube is obtained. A further object is to provide apparatus, of unusually simple design, whereby closed end tubes can be produced rapidly and in volume through the use of few moving parts.

Applicant has described similar apparatus for accomplishing substantially the same results in a co-pending application Serial No. 734,068 for Manufacture of plastic container, now Patent No. 2,452,357, October 26, 1948.

The invention is illustrated in a single embodiment by the accompanying drawing, in which—

Figure 1 is a front view in elevation of apparatus embodying my invention; Fig. 2, an enlarged part sectional view, the section being taken as indicated at line 2 of Fig. 1; and Fig. 3, a perspective view of one form of the finished product.

In the illustration given, 10 designates a frame or platform for supporting the apparatus. The frame 10 provides a raised platform 11 adapted to support the motor 12, as shown more clearly in Fig. 2.

Secured to the frame 10 by welding or by any other suitable means is a stationary vertical plate 13. Plate 13 is centrally apertured at 14. Clamped to the inner face of the plate 14 is a plate member 15 provided with an integral hub 16. Mounted upon hub 16 is a rotatable plate or carrier 17 provided on its inner side with a sleeve 18. The plate 17 is provided on its outer side with a sleeve 19.

Any suitable means for driving the plate 17 so as to rotate it with respect to the fixed plate 13 may be employed. In the illustration given, I provide the sleeve 19 with an internal gear member 20 which is secured in position by means of bolts 21. The bolts 21 extend through the outer portions of gear 20 and thence through a spacer plate 22 into threaded openings 23 in plate 17.

The motor 12 drives a shaft 24 supported in bearings 25 and 26 and carrying on its inner end a pinion 27. The pinion gear 27 meshes with the internal gear 20 and rotates the same and thereby plate 17.

The plate 17 is provided with any desired number of mandrels 28. Th mandrels 28 have a reduced portion 29 extending through the outer flange of plate 17. Preferably the mandrel is provided with an opening 30 extending centrally therethrough from one end to the other. The mandrel 28 is also provided with a flange 31, as shown more clearly in Fig. 2. The mandrel 28 is adapted to receive a plastic tube 32 within the end of which is placed a plastic disk 33.

Any suitable means may be provided for securing the plastic disk 33 against the end of the mandrel 28 or within the tube 32. If the disk is inserted within the end of the tube 32, the friction of the tube with the disk may be sufficient to hold the disk in position. In some operations, however, I prefer to have the end of the disk 33 merely abutting the end of the tube 32, and, in this relationship, it is important to have positive means for holding the disk 33 against the end of the mandrel 28. In the illustration given in Fig. 2, I provide a suction tube 34 having a nozzle 35 abutting the rear end of the mandrel 28 and communicating with the passage 30 therein. Tube 34 leads to any suitable source of suction and the suction when applied to the passage 30 causes the disk 33 to cling to the outer end of mandrel 28.

45 indicates an ultra high frequency radio wave generator. Since this structure is well known, a detailed showing is unnecessary. The output of the generator 45 is passed to a flexible wave guide 36 through the well known hairpin loop structure 37. It will be understood that any suitable connecting means may be employed and that a rigid, as well as a flexible wave guide may be employed.

In the illustration given, the wave guide 36 extends through an opening 38 in plate 13 and is provided with a nozzle 39 brought into alignment with any one of the mandrels 28. By this means, ultra high frequency energy is concentrated or directed against the edge of the disk 33 and the adjacent end of the tube 32. It will be understood that any desired number of the wave guides 36 may be employed in the apparatus.

Any suitable means for ejecting the tube after the disk has been fused to one end thereof may be employed. In the illustration given, I provide a pressure tube 40 communicating with any suitable source of air pressure, etc. The tube 40 is provided with a nozzle 41 directing the air against the inner end of the mandrel 28 so as to discharge compressed air or other medium through the longitudinal passage 39 therein. The air thus blows the tube and disk off the inner end of the mandrel 28 and the same is discharged through a tubular outlet 42.

Plate 13 is provided with any desired number of openings 43 exposing the end of the mandrel 28 and permitting the insertion of tubes 32 and disks 33 thereon. Even when suction is not continuously employed from the filling station to the final fusing station, it is found that the initial application of suction through pipe 34 draws the disk firmly against the end of the mandrel thus partially within the tube 32 so that it will be retained thereby. If desired, the suction may be continuously applied from the filling station to the final fusing station where the mandrel is brought into alignment with the nozzle 39 of wave guide 36.

*Operation*

In the operation of the device, the operator places a tube 32 upon the mandrel 28 and a disk 33 within the edge portion of the tube. The application of suction may be employed to facilitate this feeding operation. The feeding may be accomplished through the two openings 43, as shown best in Fig. 1.

When the mandrel 28 carrying the tube 32 and disc 33 reaches the nozzle 39 of the tubular wave guide 36, the application of ultra high frequency energy thereto causes the edges of the disk to fuse with the end portions of the tube thus forming a completed product in which the end of the tube is closed.

Continued rotation of the plate 17 brings the mandrel into alignment with the pressure tube 40 and compressed air passes through the passage 39 and forces the tube and disk outwardly through the ejector passage 42.

In all of the above operations, the rotation of the plate 17 is brought about by the engagement of pinion 27 with the internal gear 20, the pinion being driven by shaft 24 connected to the shaft of motor 12.

In view of the very rapid and almost instantaneous fusing effect produced by the ultra high frequency energy discharged through nozzle 39, it is not necessary that the disk 17 be operated intermittently. The disk 17 may be provided with a large number of mandrels and these may be rotated past the nozzle 39 to effect the quick fusion of the disk with the end of the tube.

It will be noted that in the apparatus shown pressure means are not required for the fusing of the ends of the tube to the disk. It is found that the ultra high frequency energy directed against the edges of the disk and the tube for a brief interval brings about complete fusion and no preforming or bending of the flange of the tube 32 is required. It will be understood, however, that forming devices for engaging the end of the tube may be employed if desired, as shown in my co-pending application 734,068 for Manufacture of plastic container.

While in the foregoing specification, I have shown one embodiment of the invention in great detail for the purpose of illustration, it will be understood that such detailed structure may be varied widely by those skilled in the art without departing from the spirit of my invention.

I claim:

1. In apparatus for forming a closed-end tube from a tube and disk of fusible plastic material, a frame, a movably mounted carrier supported in said frame, a plurality of mandrels mounted in spaced relation on said carrier, a generator of ultra high frequency energy, and a wave guide coupled with said energy and aligned with said mandrels so as to concentrate ultra high frequency thereon when said mandrels are moved past said wave guide.

2. In apparatus for forming a closed-end tube from a tube and disk of fusible plastic material, a fixed frame member, a rotatable carrier mounted thereon, mandrels carried by said carrier member in spaced relation and adapted to receive said tubes and disks, a generator of ultra high frequency energy, and a tubular wave guide coupled with said generator and having a nozzle alignable with each of said mandrels to concentrate ultra high frequency thereon to bring about the fusion of said disks and tubes.

3. In apparatus for uniting thermal plastic tubes and disks, a frame, a fixed plate carried by said frame, an ultra high frequency radio wave generator, a wave guide coupled to said generator and having a nozzle carried by said fixed plate, means for rotating said second mentioned plate, a rotatable plate mounted in spaced relation to said fixed plate, means for rotating said second mentioned plate, and a plurality of mandrels carried by said rotatable plate and adapted to be brought successively into alignment with said wave guide nozzle, said mandrels being adapted to support tubes and disks for fusion under the influence of ultra high frequency energy from said nozzle.

4. The structure of claim 3 in which the mandrels are provided with longitudinal passages and in which suction means are provided for communication with said passages.

5. The structure of claim 3 in which the mandrels are provided with longitudinal passages and in which suction and pressure means are provided for connection with said mandrel passages.

6. In apparatus for uniting tubes and disks of thermoplastic material, a frame, an ultra high-frequency generator, energy-transfer means mounted on said frame, transmission means coupling said generator to said energy-transfer means for carrying ultra high-frequency energy therethrough, a rotatable plate mounted on the frame in spaced relation to said energy-transfer means, means for rotating said plate, and a plurality of mandrels carried by said rotatable plate and adapted to be brought successively into the field of said energy-transfer means, said mandrels being adapted to support tubes and disks for fusion under the influence of ultra high-frequency energy dissipated therein from said energy-transfer means.

7. The structure of claim 6 in which the mandrels are provided with longitudinal passages and in which suction means are provided for communication with said passages.

8. The structure of claim 6 in which the mandrels are provided with longitudinal passages and in which suction and pressure means are provided for connection with said mandrel passages.

FRED V. COLLINS.

REFERENCES CITED

The following references are of record in the file of this patent:

UNITED STATES PATENTS

| Number | Name | Date |
|---|---|---|
| 1,312,570 | Palmer | Aug. 12, 1919 |
| 1,402,818 | Wentworth | Jan. 10, 1922 |
| 1,567,007 | Raiche | Dec. 22, 1925 |
| 2,125,316 | Ronci | Aug. 2, 1938 |
| 2,169,315 | Yngve | Aug. 15, 1939 |
| 2,242,774 | Brumley | May 20, 1941 |
| 2,260,264 | Scharfnagel | Oct. 21, 1941 |
| 2,422,979 | Pecker | June 24, 1947 |

OTHER REFERENCES

"Electronic heat," article in "Scientific American," April 1946, vol. 174, No. 4, page 157.

"Product engineering," Jan. 1947, pp. 137–139.

Certificate of Correction

Patent No. 2,490,416

December 6, 1949

FRED V. COLLINS

It is hereby certified that error appears in the printed specification of the above numbered patent requiring correction as follows:

Column 4, lines 36 and 37, strike out the words and comma "means for rotating said second mentioned plate,";

and that the said Letters Patent should be read with this correction therein that the same may conform to the record of the case in the Patent Office.

Signed and sealed this 28th day of March, A. D. 1950.

[SEAL]

THOMAS F. MURPHY,
*Assistant Commissioner of Patents.*